(12) United States Patent
Vu et al.

(10) Patent No.: US 10,873,217 B2
(45) Date of Patent: Dec. 22, 2020

(54) MAGNETIC FIELD FORMATION DEVICE, POWER SUPPLYING DEVICE, POWER RECEIVING DEVICE, POWER RECEIVING/SUPPLYING DEVICE, AND PORTABLE DEVICE

(71) Applicant: NITTO DENKO CORPORATION, Ibaraki (JP)

(72) Inventors: Nam Tung Vu, Ibaraki (JP); Takezo Hatanaka, Ibaraki (JP); Taiki Sueyoshi, Ibaraki (JP); Masami Inoue, Ibaraki (JP); Hisashi Tsuda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 188 days.

(21) Appl. No.: 16/073,555

(22) PCT Filed: Jan. 26, 2017

(86) PCT No.: PCT/JP2017/002620
§ 371 (c)(1),
(2) Date: Jul. 27, 2018

(87) PCT Pub. No.: WO2017/131058
PCT Pub. Date: Aug. 3, 2017

(65) Prior Publication Data
US 2019/0036382 A1    Jan. 31, 2019

(30) Foreign Application Priority Data

Jan. 27, 2016    (JP) ................................. 2016-013191

(51) Int. Cl.
*H02J 50/12*    (2016.01)
*H02J 7/02*    (2016.01)
(Continued)

(52) U.S. Cl.
CPC .............. *H02J 50/12* (2016.02); *H01F 38/14* (2013.01); *H02J 7/025* (2013.01); *H02J 50/50* (2016.02)

(58) Field of Classification Search
USPC ........................................................ 307/104
See application file for complete search history.

(56) References Cited

U.S. PATENT DOCUMENTS

2013/0234509 A1    9/2013 Ichikawa et al.
2014/0054975 A1    2/2014 Shijo et al.
(Continued)

FOREIGN PATENT DOCUMENTS

DE    102008056927 A1    6/2009
EP       2819272 A1    12/2014
(Continued)

OTHER PUBLICATIONS

May 22, 2019 Extended Search Report issued in European Patent Application No. 17744288.6.
(Continued)

*Primary Examiner* — Rexford N Barnie
*Assistant Examiner* — Xuan Ly
(74) *Attorney, Agent, or Firm* — Oliff PLC

(57) ABSTRACT

A magnetic field which is partially a variable magnetic field with high or low magnetic field strength is formed at a predetermined region. A plurality of coil pieces and generating a variable magnetic field and a power-supplying coil which is provided to generate an induced current for at least one of the coil pieces and are provided, and coil ends of two or more of the coil pieces and are connected to each other.

7 Claims, 15 Drawing Sheets

(51) Int. Cl.
*H01F 38/14* (2006.01)
*H02J 50/50* (2016.01)

(56) References Cited

U.S. PATENT DOCUMENTS

| | | | |
|---|---|---|---|
| 2014/0292100 A1* | 10/2014 | Lee | H01F 38/14 |
| | | | 307/104 |
| 2014/0312705 A1 | 10/2014 | Hatanaka et al. | |
| 2015/0015084 A1* | 1/2015 | Ichikawa | B60L 53/36 |
| | | | 307/104 |
| 2015/0222148 A1 | 8/2015 | Sampei et al. | |

FOREIGN PATENT DOCUMENTS

| | | |
|---|---|---|
| JP | 2013-074645 A | 4/2013 |
| JP | 2013-240260 A | 11/2013 |
| JP | 2015-144508 A | 8/2015 |
| WO | 2013/124977 A1 | 8/2013 |

OTHER PUBLICATIONS

Jul. 13, 2018 International Preliminary Report on Patentability issued in International Patent Application No. PCT/JP2017/002620.
Apr. 11, 2017 International Search Report issued in International Application No. PCT/JP2017/002620.
Feb. 25, 2020 Office Action issued in European Patent Application No. 17744288.6.
Mar. 3, 2020 Office Action issued in Japanese Patent Application No. 2016-013191.

* cited by examiner

FIG.11

| | ROUTE A | ROUTE B | ROUTE C |
|---|---|---|---|
| CURRENT PATH SWITCHING CONTROL UNIT ||||
| CONNECTION PATTERN 1 | FORWARD CONNECTION | REVERSE CONNECTION | REVERSE CONNECTION |
| CONNECTION PATTERN 2 | REVERSE CONNECTION | FORWARD CONNECTION | REVERSE CONNECTION |
| CONNECTION PATTERN 3 | REVERSE CONNECTION | REVERSE CONNECTION | FORWARD CONNECTION |
| CONNECTION PATTERN 4 | FORWARD CONNECTION | FORWARD CONNECTION | REVERSE CONNECTION |
| CONNECTION PATTERN 5 | REVERSE CONNECTION | FORWARD CONNECTION | FORWARD CONNECTION |
| CONNECTION PATTERN 6 | FORWARD CONNECTION | REVERSE CONNECTION | FORWARD CONNECTION |
| CONNECTION PATTERN 7 | FORWARD CONNECTION | FORWARD CONNECTION | FORWARD CONNECTION |
| CONNECTION PATTERN 8 | REVERSE CONNECTION | REVERSE CONNECTION | REVERSE CONNECTION |

17

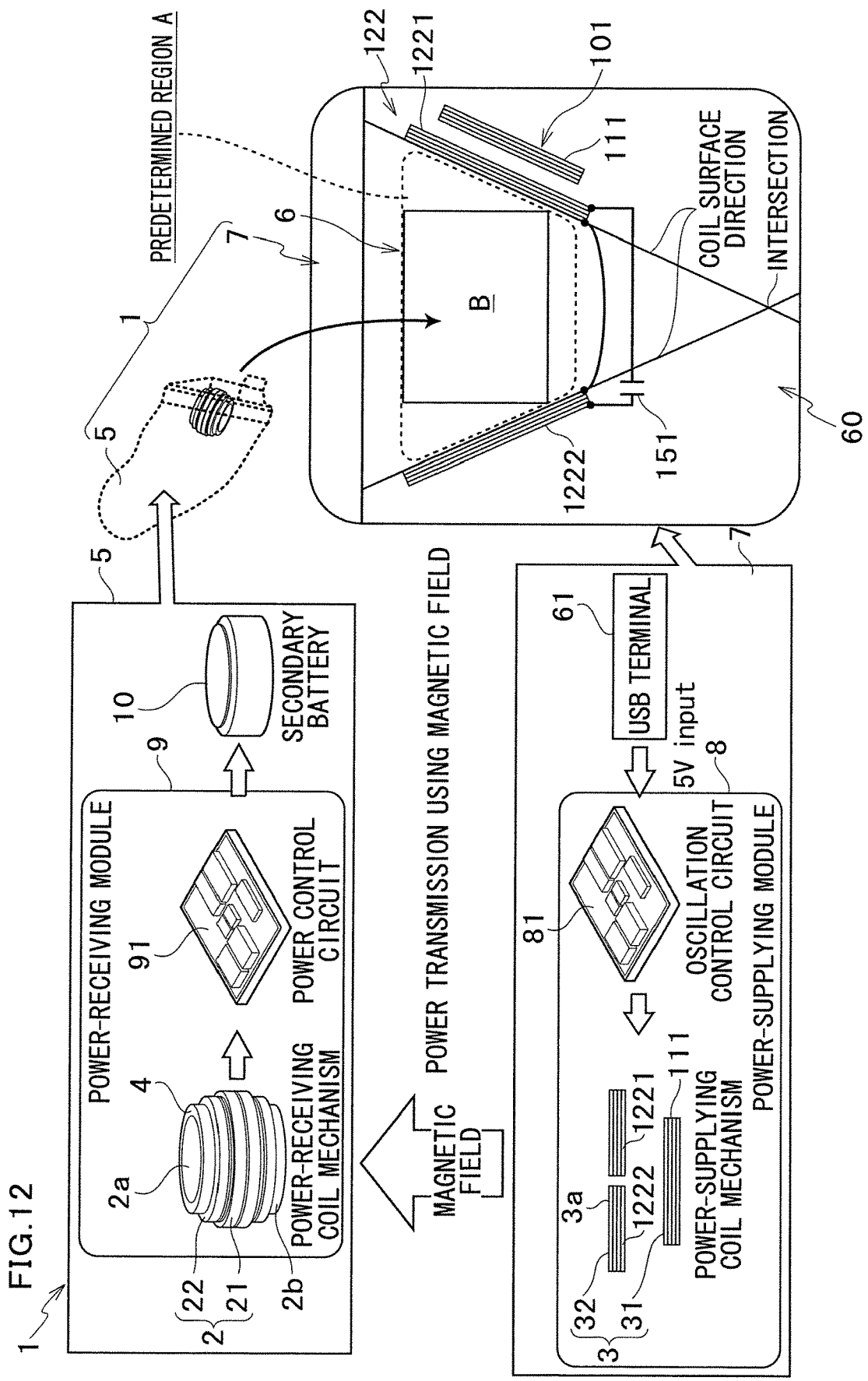

MAGNETIC FIELD FORMATION DEVICE, POWER SUPPLYING DEVICE, POWER RECEIVING DEVICE, POWER RECEIVING/SUPPLYING DEVICE, AND PORTABLE DEVICE

TECHNICAL FIELD

The present invention relates to a magnetic field formation device forming a magnetic field at a predetermined region, a power-supplying device, a power-receiving device, a power receiving/supplying device, and a mobile device.

BACKGROUND

A structure of wireless power transmission from a power feeding coil to a power-receiving coil by electromagnetic induction or magnetic field resonance has been proposed (e.g., Patent Literature 1 and Patent Literature 2).

CITATION LIST

Patent Literature

[Patent Literature 1] Japanese Unexamined Patent Publication No. 2015-144508
[Patent Literature 2] Japanese Unexamined Patent Publication No. 2013-240260

SUMMARY OF INVENTION

Technical Problem

In regard to the above, the known arrangements were done focusing on effects such as improvement in power transmission efficiency based on power transmission, and there have been no arrangements based on formation of a magnetic field at a predetermined region.

An object of the present invention is to provide a magnetic field formation device forming a magnetic field at a predetermined region, a power-supplying device, power-receiving device, a power receiving/supplying device, and a mobile device.

Solution to Problem

The present invention relates to a magnetic field formation device including a power supplying resonator including a plurality of coil pieces generating a variable magnetic field and a power-supplying coil which is provided to generate an induced current for at least one of the coil pieces, coil ends of two or more of the coil pieces being connected to each other.

According to this arrangement, a variable magnetic field with high magnetic field strength or low magnetic field strength can be formed at a part of a predetermined region by only changing the coil winding direction without changing the layout of the power supplying resonator, by switching the connection relationship of one coil end and the other coil end between the coil pieces having the coil ends connected to each other.

The magnetic field formation device of the present invention may further include a connection switcher which is provided between the coil pieces having the coil ends connected to one another and is capable of switching the coil ends of the coil pieces between a forward connection state and a reverse connection state.

According to this arrangement, one coil end and the other coil end of the coil piece can be easily switched only by operating the connection switcher. As a result, it is possible to change only the coil winding direction without changing the layout of the power supplying resonator.

The magnetic field formation device of the present invention may further include a switching controller which controls the connection switcher to alternately switch the coil ends between the forward connection state and the reverse connection state.

According to this arrangement, as the coil winding direction is alternately changed, it is possible to generate a magnetic field with magnetic field strength which is an average between the magnetic field strength distribution in the forward connection state and the magnetic field strength distribution in the reverse connection state.

The present invention relates to a power-supplying device including the above-described magnetic field formation device.

The present invention relates to a power-receiving device including a power-receiving mechanism which is configured to receive power by a variable magnetic field generated at a predetermined region by the above-described magnetic field formation device.

The present invention relates to a power receiving/supplying device including: a power-supplying device including the above-described magnetic field formation device; and power-receiving device including a power-receiving mechanism which is configured to receive power by the variable magnetic field generated by the power-supplying device.

The present invention relates to a mobile device including a power-receiving mechanism which is configured to receive power by a variable magnetic field generated at a predetermined region by the above-described magnetic field formation device.

Advantageous Effects of Invention

According to the present invention, a magnetic field which is partially a variable magnetic field with high or low magnetic field strength can be formed at the predetermined region.

BRIEF DESCRIPTION OF DRAWINGS

FIG. 11 illustrates operations of a current path switching control unit.

FIG. 12 is a block diagram of a power receiving/supplying device.

DESCRIPTION OF EMBODIMENTS

The following will describe an embodiment of the present invention with reference to drawings.

(Magnetic Field Formation Device)

Figure 1:
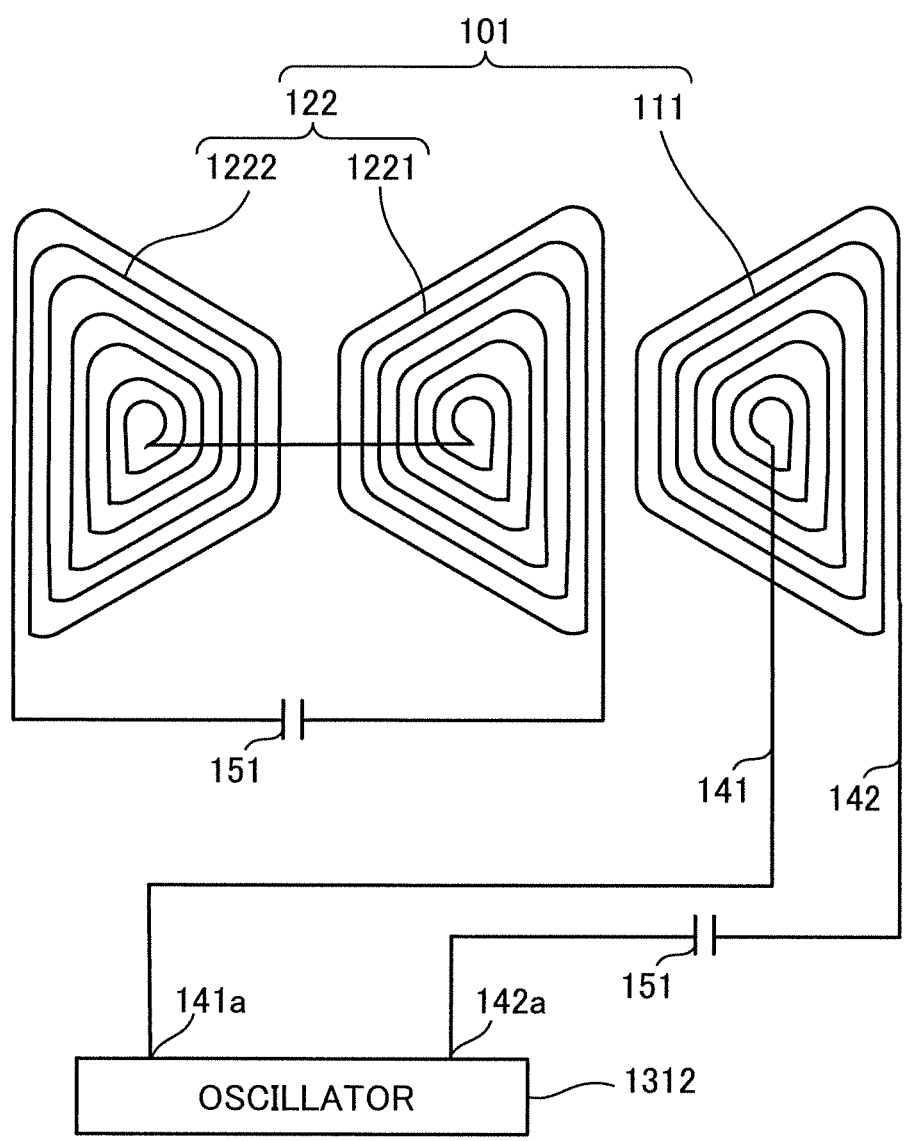
FIG. 1 is a schematic explanatory diagram of a magnetic field formation device.

As shown in FIG. 1, a magnetic field formation device 101 includes a power supplying resonator 122 including a plurality of coil pieces 1221 and 1222 generating a variable magnetic field and a power-supplying coil 111 which is provided to generate an induced current for at least one of the coil pieces 1221 and 1222, and coil ends of two or more of the coil nieces 1221 and 1222 are connected to each other.

A resonance capacitor 151 is provided on at least one of a first current path 141 on one coil end side and a second current path 142 on the other coil end side of the power-supplying coil 111. The resonance capacitor 151 is provided on the first current path 141 or the second current path 142 to be in series with or parallel to one of the power-supplying coil 111. Furthermore, the power supplying resonator 122 includes a resonance capacitor 151 which is connected in series with and/or parallel to the coil pieces 1221 and 1222.

Specific examples of the connection states of the resonance capacitor 151 with the power-supplying coil 111 are shown in FIG. 2A to FIG. 2H. The same connection states are applicable to the power supplying resonator 122.

Figure 2A:
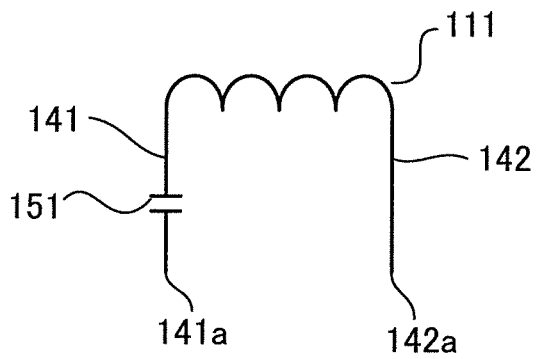
FIG. 2A illustrates a connection relation between a power-supplying coil and a resonance capacitor.
Figure 2B:
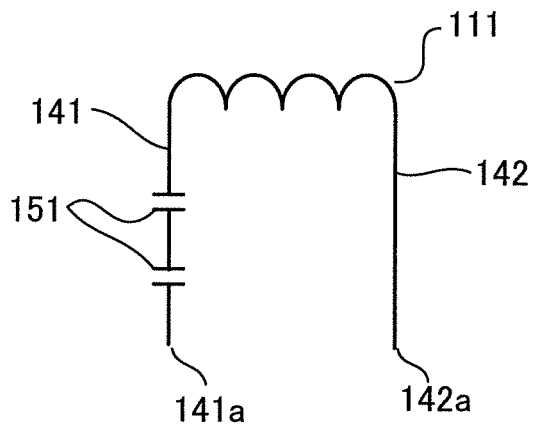
FIG. 2B illustrates a connection relation between a power-supplying coil and a resonance capacitor.
Figure 2C:
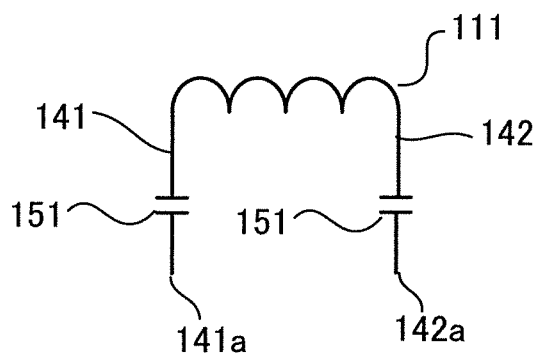
FIG. 2C illustrates a connection relation between a power-supplying coil and a resonance capacitor.

FIG. 2A shows a state in which a resonance capacitor 151 is connected in series at a part of the first current path 141, which is between the end portion 141a of the first current path 141 and the coil end of the power-supplying coil 111. FIG. 2B shows a state in which two resonance capacitors 151 are connected in series on the first current path 141. FIG. 2C shows a state in which resonance capacitors 151 are connected in series on the first current path 141 and the second current path 142, respectively.

Figure 2D:
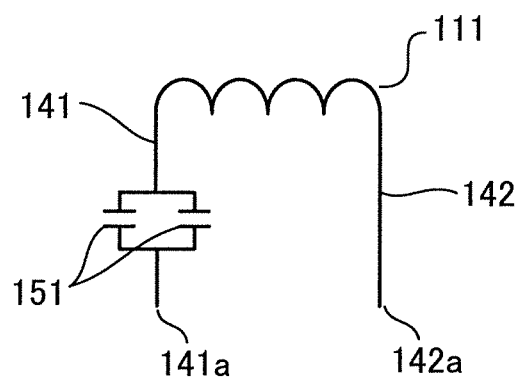
FIG. 2D illustrates a connection relation between a power-supplying coil and a resonance capacitor.
Figure 2E:
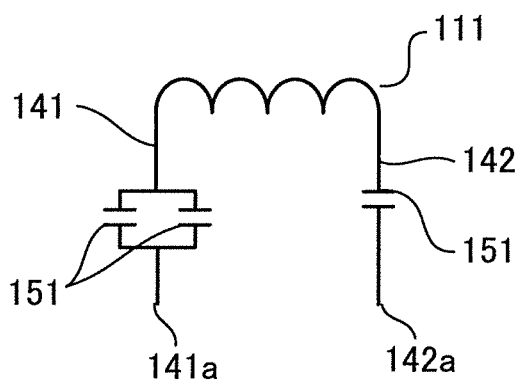
FIG. 2E illustrates a connection relation between a power-supplying coil and a resonance capacitor.
Figure 2F:
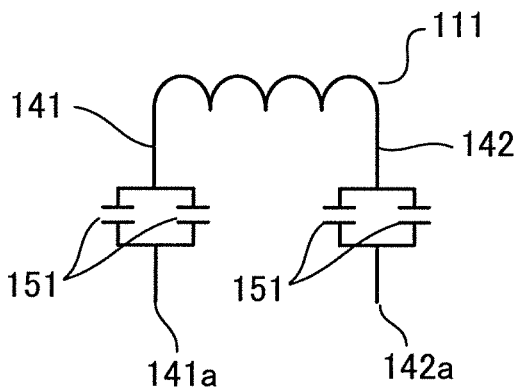
FIG. 2F illustrates a connection relation between a power-supplying coil and a resonance capacitor.

FIG. 2D shows a state in which two resonance capacitors 151 provided in a parallel manner are connected in series on the first current path 141. FIG. 2E shows a state in which two resonance capacitors 151 provided in a parallel manner are connected in series on the first current path 141 whereas a resonance capacitor 151 is connected in series on the second current path 142. FIG. 2F shows a state in which two resonance capacitors 151 provided in a parallel manner are connected in series on the first current path 141 whereas two resonance capacitors 151 provided in a parallel manner are connected in series on the second current path 142.

Figure 2G:
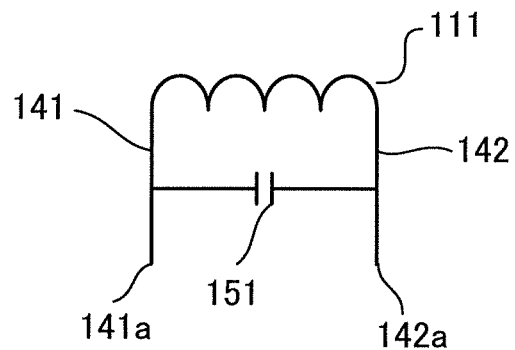
FIG. 2G illustrates a connection relation between a power-supplying coil and a resonance capacitor.
Figure 2H:
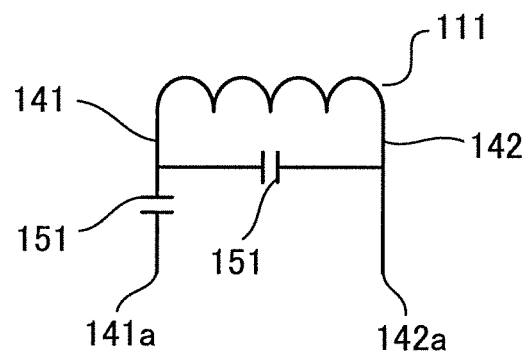
FIG. 2H illustrates a connection relation between a power-supplying coil and a resonance capacitor.

FIG. 2G shows a state in which a resonance capacitor 151 is connected to the first current path 141 and the second current path 142 to be parallel to the power-supplying coil 111. FIG. 2H shows a state in which a resonance capacitor 151 is connected to the first current path 141 and the second current path 142 to be parallel to the power-supplying coil 111, and a resonance capacitor 151 is connected in series on the first current path 141. The connection states shown in FIG. 2A to FIG. 2H are examples, and the number, the series connection, the parallel connection, and the locations of the resonance capacitors 151 may be suitably selected and combined.

To be more specific, the magnetic field formation device 101 includes the power supplying resonator 122 and the power-supplying coil 111. Furthermore, the power supplying resonator 122 includes the above-described resonance capacitor 151 and the coil pieces 1221 and 1222 having coil terminals connected to one another. The power-supplying coil 111 is provided to face the coil piece 1221. The power-supplying coil 111 is connected to an oscillator 1312 outputting a variable current, via the first current path 141 and the second current path 142. With this arrangement, when the variable current from the oscillator 1312 is supplied to the power-supplying coil 111, the power-supplying coil 111 supplies a variable magnetic field to the coil piece 1221 and an induced current generated by electromagnetic induction flows in the coil piece 1221. This induced current flows in the other coil piece 1222 connected to the coil piece 1221, too. As a result, each of the coil pieces 1221 and 1222 of the power supplying resonator 122 generates a variable magnetic field.

At this stage, because the coil ends of the coil pieces 1221 and 1222 are connected to one another, it is possible to change the coil winding direction without changing the layout of the power supplying resonator 122 including the coil pieces 1221 and 1222, by switching the connection relationship of one coil end and the other coil end between the coil pieces 1221 and 1222. In this way, a variable magnetic field with high magnetic field strength or low magnetic field strength can be formed at a part of the predetermined region by changing the connection relationship of coil ends of each of the coil pieces 1221 and 1222.

In addition to the above, in the magnetic field formation device 101, variable magnetic fields are generatable from all coil pieces 1221 and 1222 even if the number of the power-supplying coil 111 is smaller than that of the coil pieces 1221 and 1222. On this account, component cost regarding the power-supplying coil 111 is reduced as compared to cases where variable magnetic fields are generated by the power-supplying coils 111, the number of which is identical with the number of the coil pieces 1221 and 1222. Furthermore, even if the power-supplying coil 111 is disposed to supply a magnetic field only to a particular one of the coil pieces 1221 and 1222, the magnetic field is supplied to all of the coil pieces 1221 and 1222. It is therefore possible to improve the degree of freedom in the layout of the coil pieces 1221 and 1222 (power supplying resonator 122) and the power-supplying coil 111.

Figure 3:
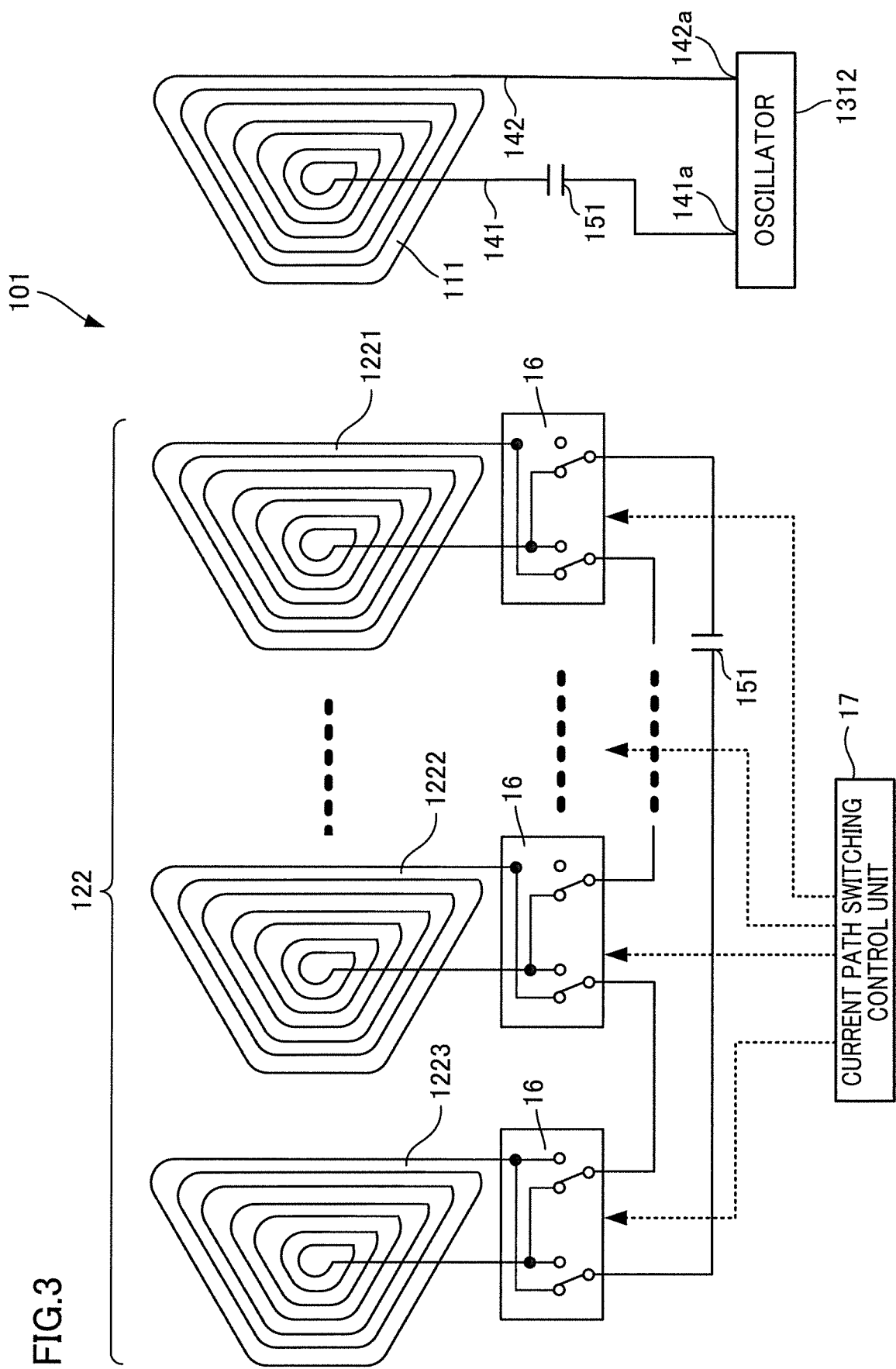
FIG. 3 is a schematic explanatory diagram of a magnetic field formation device.

As shown in FIG. 3, the magnetic field formation device 101 may include a connection switcher 16 which is provided between the coil pieces 1221, 1222, and 1223 connected in series and is capable of switching the coil ends of the coil pieces 1221, 1222, and 1223 between a forward connection state and a reverse connection state. In this case, one coil end and the other coil end of each of the coil pieces 1221, 1222, 1223 can be easily switched only by operating the connection switcher 16.

The magnetic field formation device 101 may include a current path switching control unit 17 (switching controller)

which controls the connection switcher 16 for alternately switching the coil ends between the forward connection state and the reverse connection state. In this case, as the coil winding direction is alternately and repeatedly changed, it is possible to generate a magnetic field with magnetic field strength which is an average between the magnetic field strength distribution in the forward connection state and the magnetic field strength distribution in the reverse connection state.

Figure 4:
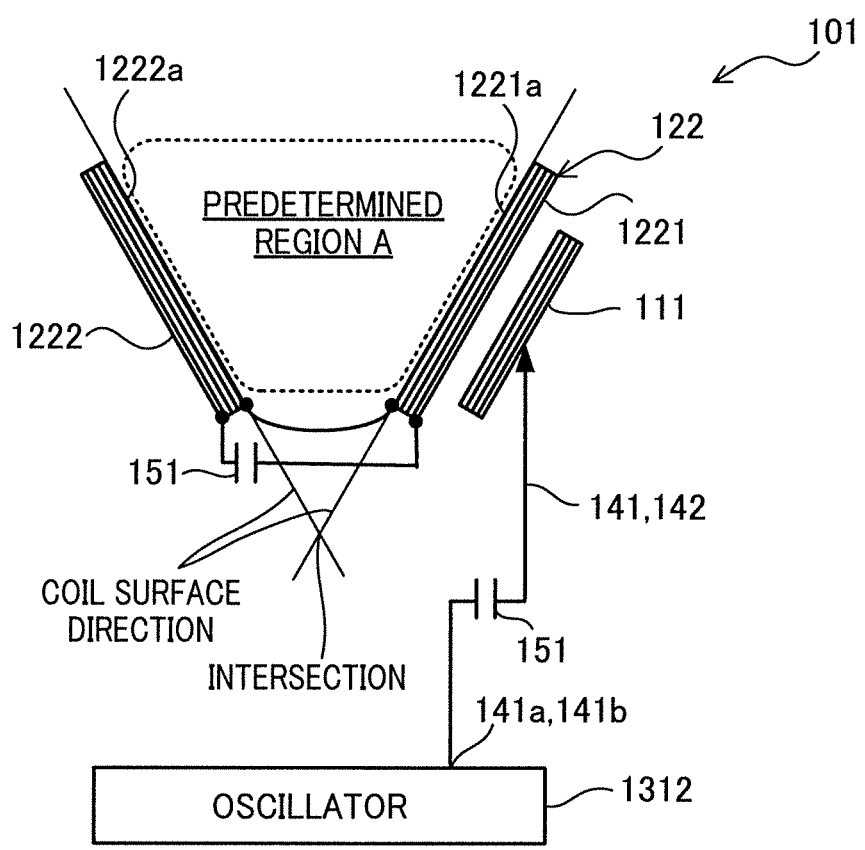
FIG. 4 is a schematic explanatory diagram of a magnetic field formation device in a front view.

As shown in FIG. 4, all of the coil pieces 1221 and 1222 are provided so that coil surfaces 1221a and 1222a oppose the predetermined region A, and at least one of the coil pieces 1221 and 1222 is provided to have a coil surface direction intersecting with the coil surface direction of the other one of the coil pieces 1221 and 1222. The coil surface direction is a direction in parallel to a coil surface. Alternatively, at least one of the coil pieces 1221 and 1222 may be provided to have a coil surface direction parallel to the coil surface direction of the other one of the coil pieces 1221 and 1222.

In the magnetic field formation device 101 arranged as described above, a variable magnetic field can be generated at the predetermined region A which is partially covered with the coil surfaces 1221a and 1222a of the coil pieces 1221 and 1222. In this way, a variable magnetic field with high magnetic field strength or low magnetic field strength can be formed at a part of the predetermined region A by adjusting the angles, locations, etc. of the coil surfaces 1221a and 1222a of the coil pieces 1221 and 1222 of the power supplying resonator 122.

The "variable magnetic field" indicates one of (1) a magnetic field in a state in which the direction of the magnetic lines of force alternately changes between the forward direction and the reverse direction, (2) a magnetic field in a state in which the magnetic field strength changes while the direction of the magnetic lines of force is the forward direction, (3) a magnetic field in a state in which die magnetic field strength changes while the direction of the magnetic lines of force is the reverse direction, and (4) a magnetic field in a state in which two or more of the states (1) to (3) are combined.

Figure 5:
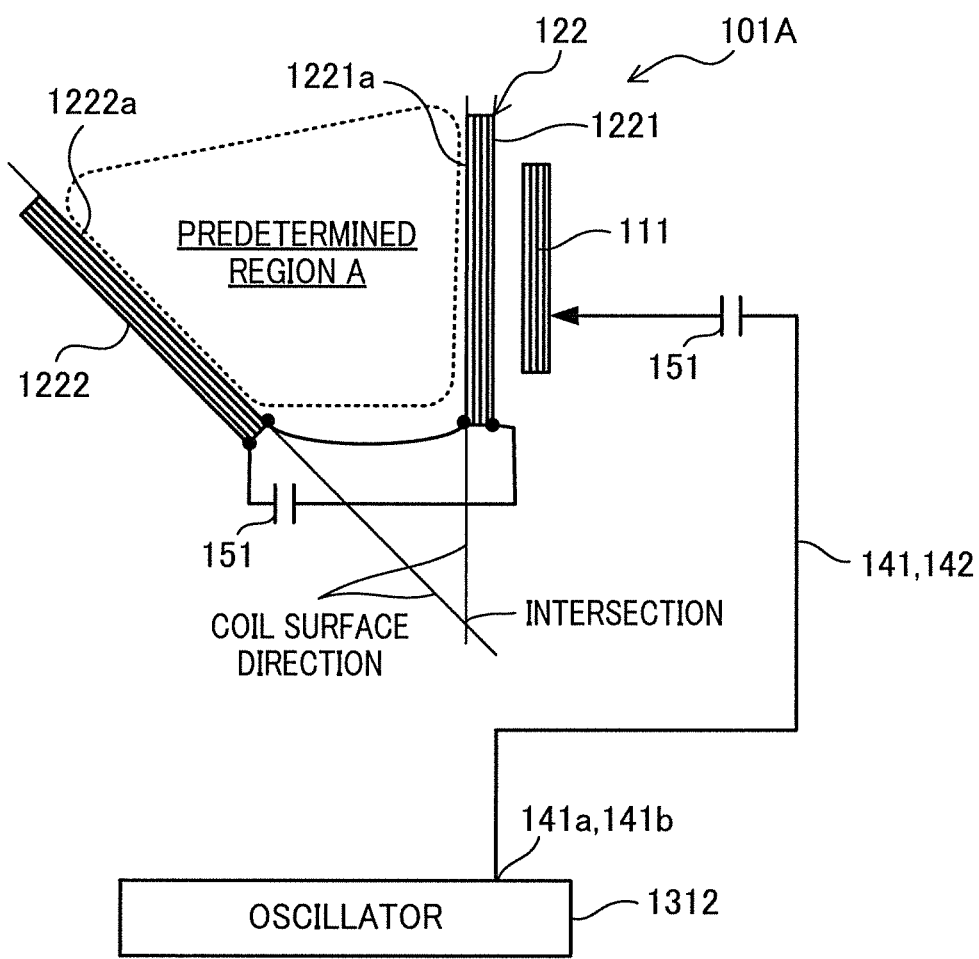
FIG. 5 is a schematic explanatory diagram of a magnetic field formation device in a front view.
Figure 6:
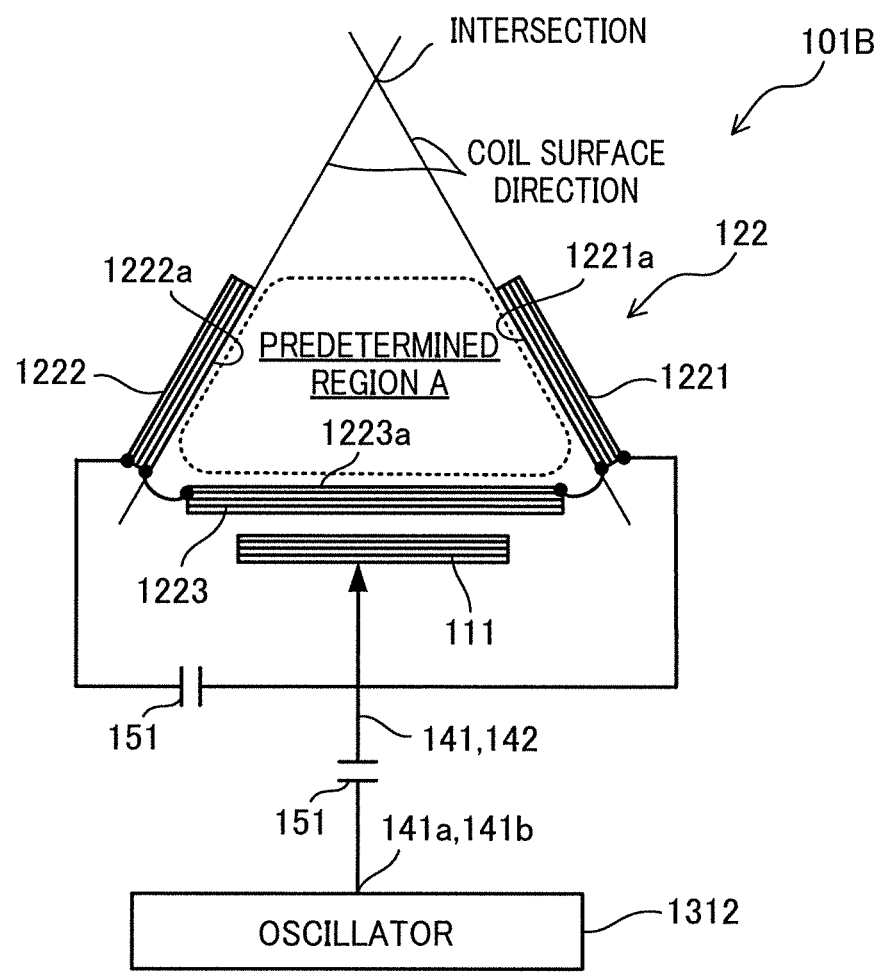
FIG. 6 is a schematic explanatory diagram of a magnetic field formation device in a front view.

The "predetermined region A" may be of any size or shape. The predetermined region A is a reverse frustum in shape, in which the lower face is smaller in diameter than the upper face. The reverse frustum shape may be a reverse circular frustum shape, a reverse square frustum shape, or an N-sided frustum shape. While in the present embodiment the predetermined region A is reverse frustum in shape, the disclosure is not limited to this arrangement. In other words, as shown in FIG. 5, the inclination angle of at least one side face may be different from the inclination angles of the remaining side faces in the predetermined region A, or the predetermined region A may be a frustum in which the lower face is larger in diameter than the upper face as shown in FIG. 6. The predetermined region A may be sized and shaped to correspond to an object provided in the variable magnetic field, or may be sized and shaped to correspond to a receiving space such as a container, a housing box, a room, etc. in which the object is housed. The "predetermined region A" may be a hexahedron such as a rectangular parallelepiped body, a cube, or a triangular prism.

An example of the "object" is a driving device including a power-receiving device to which power is supplied by a variable magnetic field. The driving device encompasses all types of devices driven by electric power. Examples are a mobile device, a home electric appliance, and an automobile.

(Magnetic Field Formation Device: Power-Supplying Coil and Power Supplying Resonator)

The "power-supplying coils" are of a spiral type, a solenoid type, or a loop type, for example, and are coils which generate an induced current at a power supplying resonator on account of an externally-supplied variable current. Meanwhile, the coil pieces 1221 and 1222 of the "power supplying resonator" are of a spiral type, a solenoid type, or a loop type, for example, and are coils in each of which the ends of each of the coil pieces 1221 and 1222 are directly connected (short-circuited) to each other via a current path or indirectly connected (short-circuited) to each other by a current path and a GND and the like. When an induced current is supplied, the power supplying resonator generates a variable magnetic field at the predetermined region A opposing the coil surface 1221a and 1222a and generates a variable magnetic field at a region opposite to the predetermined region A over the power supplying resonator 121.

The "variable current" indicates one of (1) a current which alternately varies to the positive side and the negative side over 0 ampere, (2) a current which varies on the positive side, (3) a current which varies on the negative side, and (4) a current in a state in which two or more of the states (1) to (3) are combined.

All of the coil pieces of the power supplying resonator are provided so that coil surfaces oppose the predetermined region, and at least one of the coil pieces is provided to have a coil surface direction intersecting with the coil surface direction of the other one of the coil pieces. For example, in case of the magnetic field formation device 101, 101A including the predetermined region A as shown in FIG. 4 and FIG. 5, the coil surfaces 1221a and 1222a of the coil pieces 1221 and 1222 are disposed to oppose the side faces of the predetermined region A, and hence the coil surface directions of the coil pieces 1221 and 1222 intersect with each other at a location below the predetermined region A.

Meanwhile, in case of the magnetic field formation device 101B including the predetermined region A as shown in FIG. 6, the coil surfaces 1221a and 1222a of the coil pieces 1221 and 1222 are disposed to oppose the side faces of the predetermined region A and the coil surface 1223a of the coil piece 1223 is disposed to oppose the bottom surface of the predetermined region A, and hence the coil surface directions of the coil pieces 1221 and 1222 intersect with each other at a location above the predetermined region A.

Figure 7:
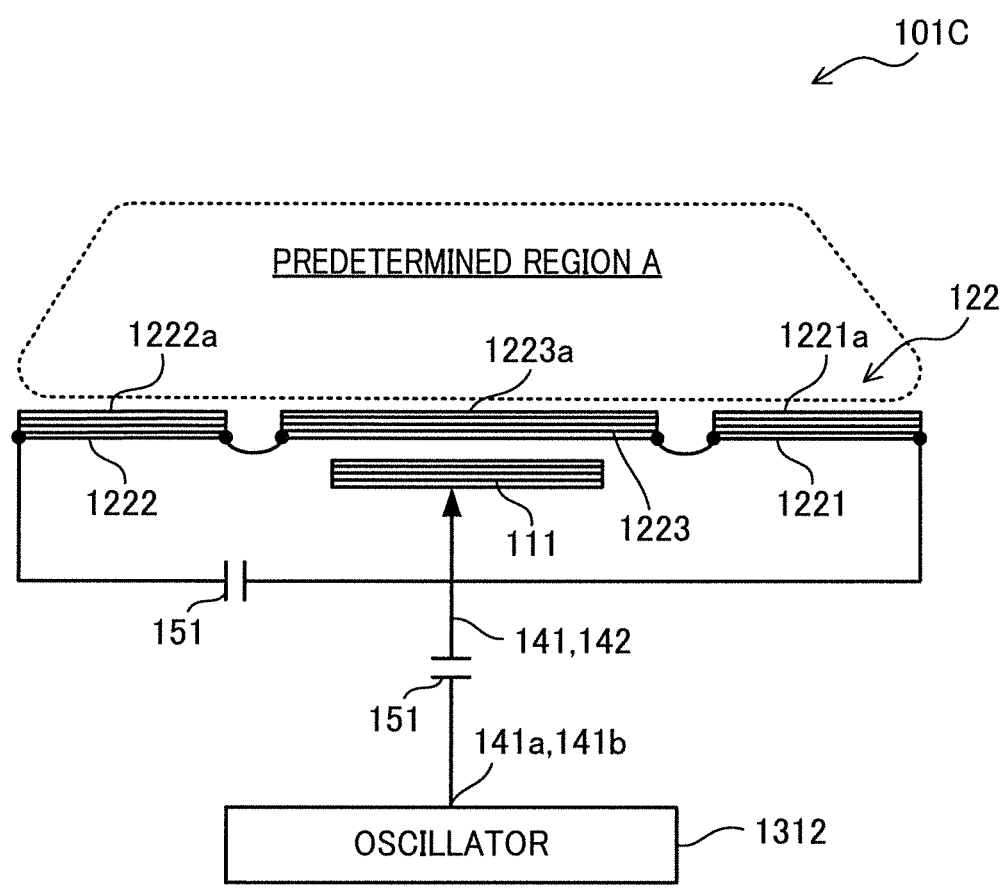
FIG. 7 is a schematic explanatory diagram of a magnetic field formation device in a front view.

As shown in FIG. 7, a magnetic field formation device 1010 may be arranged such that plural, e.g., three coil pieces 1221, 1222, and 1223 are disposed to form a flat plate. In other words, in the power supplying resonator 122, the coil pieces 1221, 1222, and 1223 may be arranged so that the coil surfaces 1221a, 1222a, and 1223a of the coil pieces 1221, 1222, and 1223 are on the same plane. In this case, the size and shape of the predetermined region A in the planar direction can be arbitrarily set by increasing the number of the coil pieces 1221, 1222, and 1223 provided. The disposition direction may be a horizontal direction, a vertical direction, or a direction inclined with respect to the vertical direction or the horizontal direction.

Figure 8:
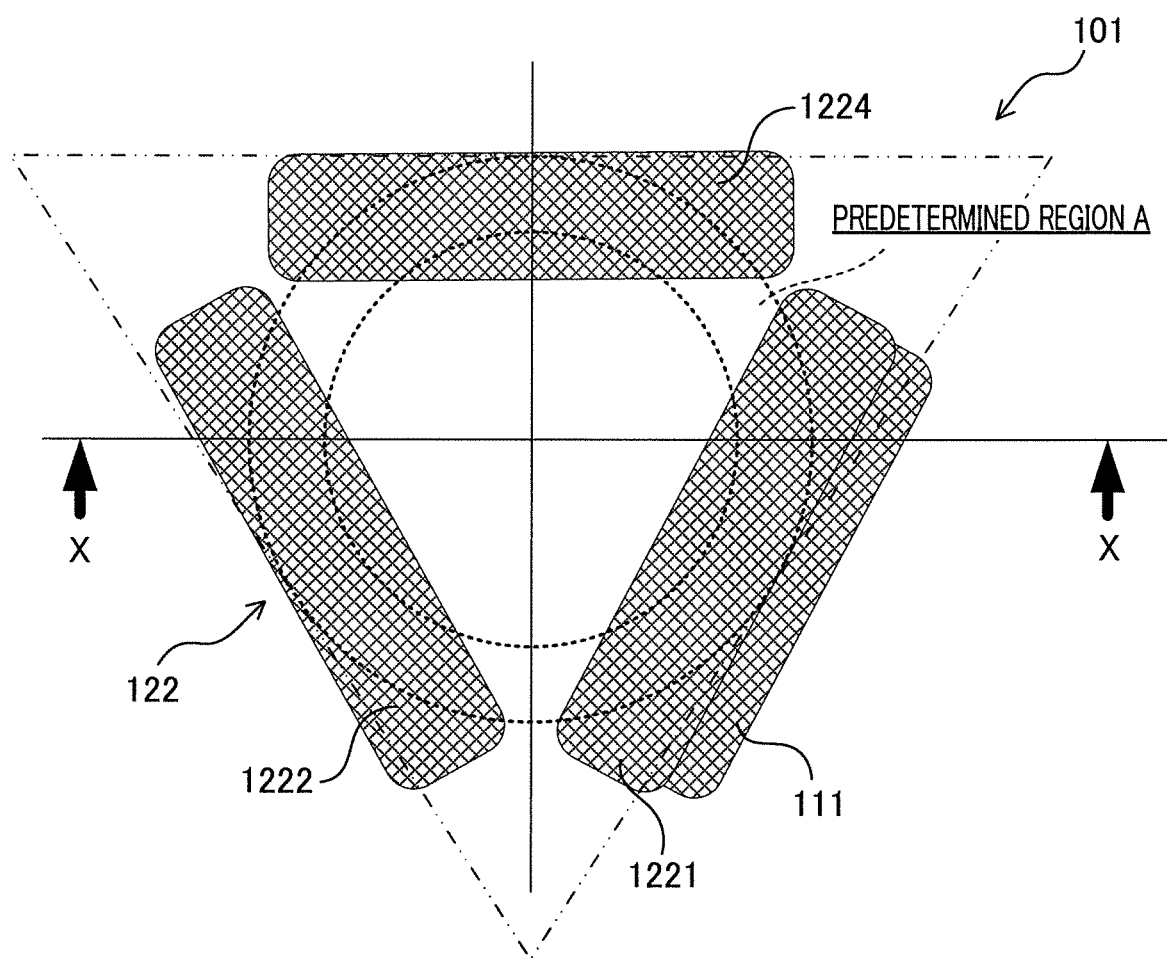
FIG. 8 is a schematic explanatory diagram of a magnetic field formation device in a plan view.
Figure 9:
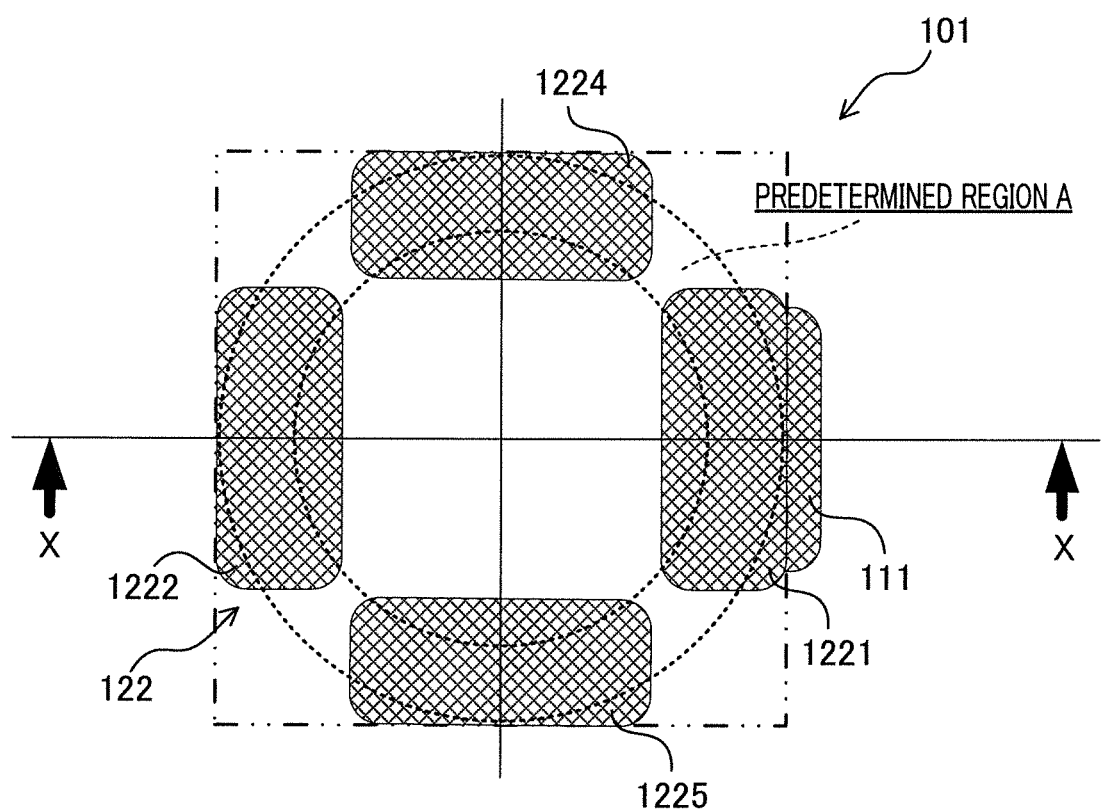
FIG. 9 is a schematic explanatory diagram of a magnetic field formation device in a plan view.

Alternatively, for example, as shown in FIG. 8, the power supplying resonator 122 may be arranged such that, when viewed from a point above the predetermined region A, three coil pieces 1221, 1222, and 1224 may be provided along the respective sides of an equilateral triangle which is centered at the predetermined region A. Alternatively, for example, as shown in FIG. 9, the power supplying resonator 122 may be arranged such that, when viewed from a point above the predetermined region A, three coil pieces 1221, 1222, 1223, and 1224 may be provided along the respective sides of a square which is centered at the predetermined region A. In each of these cases, the state of the end face cut along the X-X line in FIG. 8 corresponds to the positional relation between the coil pieces 1221 and 1222 of the power supplying resonator 122 shown in FIG. 4.

(Magnetic Field Formation Device: Oscillation Controller)

Figure 10:
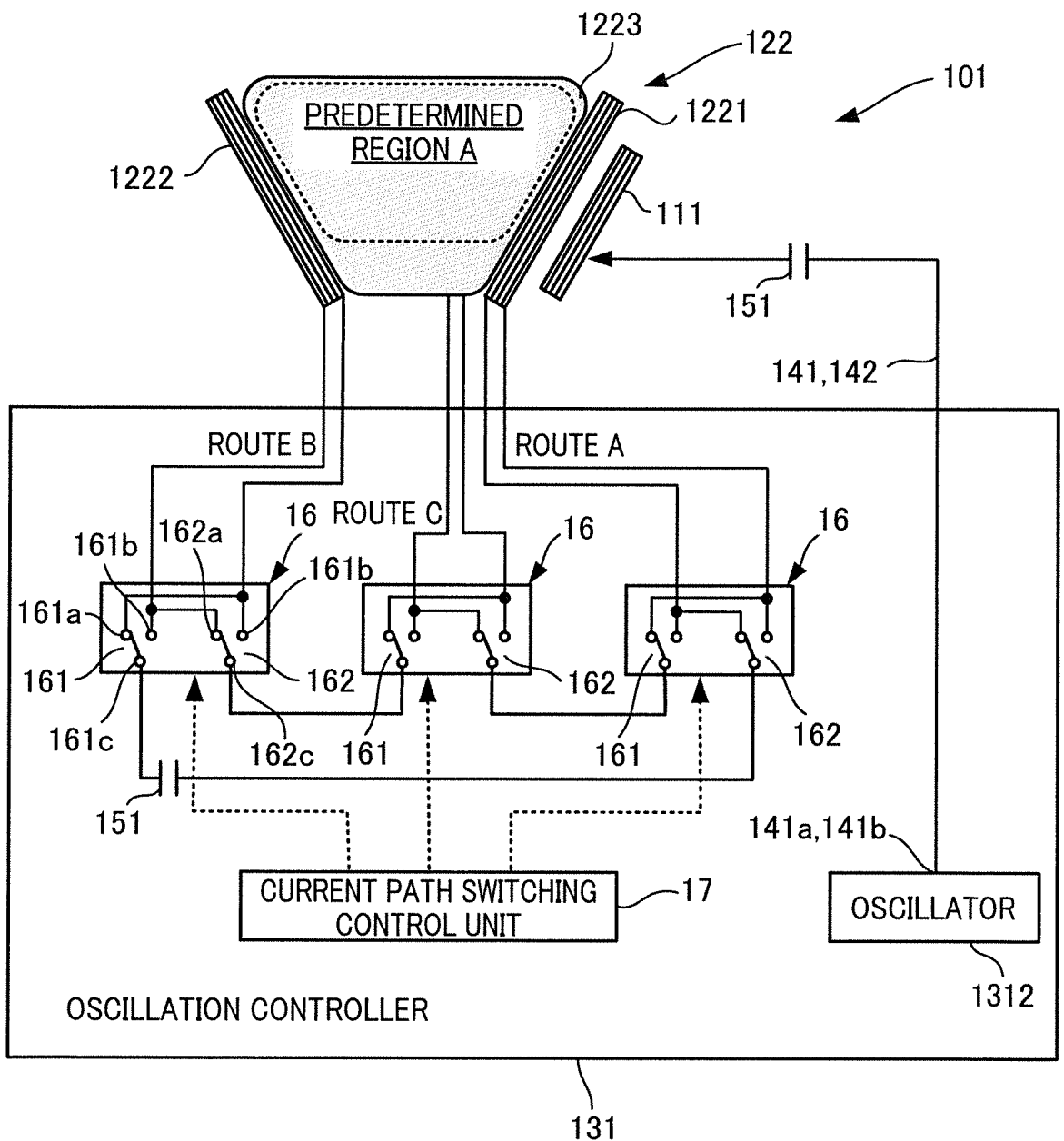
FIG. 10 is a block diagram of a magnetic field formation device.

As shown in FIG. 10, the magnetic field formation device 101 structured as above includes an oscillation controller 131. While a magnetic field formation device 101 in which a power supplying resonator 122 includes three coil pieces 1221, 1222, and 1223 will be described below, the disclosure is not limited to this arrangement.

The oscillation controller 131 includes the oscillator 1312 configured to output a variable current to the power-supplying coil 111, three connection switchers 16 provided to correspond to the respective coil pieces 1221, 1222, and 1223, and the current path switching control unit 17 configured to control the switching operation of each connection switcher (Magnetic Field Formation Device: Oscillation Controller: Oscillator)

The oscillator 1312 is capable of outputting a variable current with any oscillating frequency. The oscillating frequency of the oscillator 1312 is preferably changeable to allow for the use of various types of magnetic field formation devices 101. Furthermore, each of the oscillating frequency, the voltage, and the current of the oscillator 1312 may be changeable in accordance with the specification of the power-supplying coil 111 which is the output target.

(Magnetic Field Formation Device: Oscillation Controller: Connection Switcher)

As shown in FIG. 3, the connection switchers 16 are provided for each of the coil pieces 1221, 1222, and 1223 connected in series and are capable of switching the coil ends of the coil pieces 1221, 1222, 1223 between a forward connection state and a reverse connection state. To be more specific, each connection switcher 16 includes a first switch 161 with 1 input and 2 outputs and a second switch 162 with 1 input and 2 outputs. The first switch 161 and the second switch 162 are operated by a control signal from the current path switching control unit 17, and are arranged such that a forward connection state in which an input terminal 162*c* of the second switch 162 is connected to a first output terminal 162*a* is established in a forward connection state in which the input terminal 161*c* of the first switch 161 is connected to the first output terminal 161*a*, whereas a reverse connection state in which the input terminal 162*c* of the second switch 162 is connected to a second output terminal 162*b* is established in a reverse connection state in which the input terminal 161*c* of the first switch 161 is connected to the second output terminal 161*b*.

The first output terminal 161*a* of the first switch 161 is connected to the second output terminal 162*b* of the second switch 162. The second output terminal 161*b* of the first switch 161 is connected to the first output terminal 161*a* of the second switch 162. With this arrangement, when the input terminals 161*c* and 162*c* of the first switch 161 and the second switch 162 are connected to the respective first output terminals 161*a* and 162*a*, the input terminal 161*c* of the first switch 161 is connected to the second output terminal 162*b* which is in the disconnected state in the second switch 162, and the input terminal 162*c* of the second switch 162 is connected to the second output terminal 161*b* which is in the disconnected state in the first switch 161.

Meanwhile, when the input terminals 161*c* and 162*c* are connected to the respective second output terminals 161, and 162*b*, the input terminal 161*c* is connected to the first output terminal 162*a* which is in the disconnected state and the input terminal 162*c* is connected to the first output terminal 161*a* which is in the disconnected state.

In each connection switcher 16 arranged as above, the first output terminal 161*a* is connected to one coil end of each of the coil pieces 1221, 1222, and 1223, and the second output terminal 161*b* is connected to the other coil end of each of the coil pieces 1221, 1222, and 1223. Furthermore, in the connection switcher 16, the input terminals 161*c* and 162*c* are connected to each other so that the coil pieces 1221, 1222, and 1223 are connected in series, i.e., the coil ends of the coil pieces 1221 and 1222 are connected to each other, the coil ends of the coil pieces 1222 and 1223 are connected to each other, and the coil ends of the coil pieces 1223 and 1221 are connected to each other, and the input terminals 161*c* and 162*c* on the respective end sides are connected to the GND.

(Magnetic Field Formation Device: Oscillation Controller: Current Path Switching Control Unit)

As shown in FIG. 11, the current path switching control unit 17 connects the coil pieces 1221, 1222, and 1223 in series in one of eight connection patterns 1 to 8, by outputting a control signal to each connection switcher 16 and switching the first and second switches 161 and 162 of each connection switcher 16 between a forward connection state and a reverse connection state.

To be more specific, when current paths between the coil pieces 1221, 1222, and 1223 and the connection switchers 16 are a route A, a route B, and a route C, there are (1) a connection pattern 1 in which the connection switcher 16 on the route A is in the forward connection and the connection switchers 16 on the routes B and C are in the reverse connection, (2) a connection pattern 2 which the connection switchers 16 on the routes A and C are in the reverse connection and the connection switcher 16 on the route B is in the reverse connection, (3) a connection pattern 3 in which the connection switchers 16 on the routes A and B are in the reverse connection and the connection switcher 16 on the route C is in the forward connection, (4) a connection pattern 4 in which the connection switchers 16 on the routes A and B are in the forward connection and the connection switcher 16 on the route C is in the reverse connection, (5) a connection pattern 5 in which the connection switcher 16 on the route A is in the reverse connection and the connection switchers 16 on the routes B and C are in the forward connection, (6) a connection pattern 6 in which the connection switchers 16 of the routes A and C are in the forward connection and the connection switcher 16 on the route B is in the reverse connection, (7) a connection pattern 7 in which the connection switchers 16 on the routes A, B, and C are in the forward connection, and (8) a connection pattern 8 in which the connection switchers 16 on the routes A, B, and C are in the reverse connection and the forward connection. The current path switching control unit 17 is able to switch a combination selected from these connection patterns 1 to 8 at any timing.

The current path switching control unit 17 may be constituted by a circuit having a programmability such as a microcomputer and an operation of switching may executed by software, or may be constituted by a combination of ICs and the switching operation may be executed by hardware.

(Application Example of Magnetic Field Formation Device)

The following will describe a case where the magnetic field formation device 101 structured as above is used in a power-supplying device as shown in FIG. 12. To put it differently, the following will describe a ease where the magnetic field formation device 101 is mounted on the charger 7 as a power-supplying device and electric power is supplied in a wireless manner to the power-receiving module 9 which is a power-receiving device of the driving device 5 mounted in the charger 7.

The charger 7 (power-supplying device) on which the magnetic field formation device 101 is mounted and the driving device 5 (secondary battery 10, power-receiving module 9) constitute a power receiving/supplying device 1 or a power receiving/supplying system. To put it differently, the power receiving/supplying device 1 includes the driving device 5 including the power-receiving coil mechanism 2 receiving power by a magnetic field and the charger 7 supplying power to the driving device 5 by wireless transmission.

In the power receiving/supplying device 1, the charger 7 and the driving device 5 may be treated in combination. While the description below deals with a case where the power-receiving coil mechanism 2 receives power by magnetic field resonance, the disclosure is not limited to this arrangement and it may receive power by electromagnetic induction.

(Application Example of Magnetic Field Formation Device: Charger and Housing Cup)

The charger 7 includes the housing cup 6 in which the driving device 5 such as a mobile device including a power-receiving device is mounted and the magnetic field formation device 101 which is configured to generate a variable magnetic field at the housing region B of the housing cup 6 to allow the power-receiving module 9 to receive power irrespective of the direction and position of the power-receiving module 9. The housing cup 6 may be arranged such that plural driving devices 5 are simultaneously placed at the housing region B. To put it differently, the housing region B of the housing cup 6 may have a capacity capable of simultaneously storing plural driving devices 9.

The magnetic field formation device 101 is provided in a casing of the charging case 60 in which the housing cup 6 is provided. When the magnetic field formation device 101 is employed in the charger 7, the power supplying resonator 122 functions as the power-supplying resonator 32 whereas the power-supplying coil 111 functions as the power feeding coil 31. A power-supplying coil mechanism 3 including the power-supplying resonator 32 and the power feeding coil 31 is connected to an oscillation control circuit 81 which is an IC chip in which the oscillation controller 131 outputting a variable current is embodied.

The oscillation control circuit 81 and the power-supplying coil mechanism 3 are combined as a power-supplying module 8 in order to improve the handleability. The oscillation control circuit 81 is connected to a USB terminal 61. The USE terminal 61 is connectable to an unillustrated USE cable of an external device such as a personal computer provided outside the charger 7, so that 5V DC power can be supplied from the external device to the oscillation control circuit 81. Instead of the USE terminal 61, the charger 7 may be connected to a home AC power cord, and DC power converted from AC power by a rectifying circuit and a converter may be suppliable to the oscillation control circuit 81.

(Application Example of Magnetic Field Formation Device: Driving Device)

An example of the driving device 5 charged and driven by the above-described charger 7 is a mobile device. The mobile device encompasses a handheld device which can be carried on a hand and a human-wearable device which can be worn a human body. Specific examples of the mobile device include a portable computer (a laptop PC, a note PC, a tablet PC, or the like), a headset, a camera, an audio visual device (a portable music player, an IC recorder, a portable DVD player, or the like), a calculator (such as a pocket computer and an electronic calculator), a game console, a computer peripheral (a portable printer, a portable scanner, a portable modem, or the like), a dedicated information device (an electronic dictionary, an electronic notebook, an electronic book, a portable data terminal, or the like), a portable communication terminal, a voice communication terminal (a portable phone, a PHS, a satellite phone, a third party radio system, an amateur radio, a specified low power radio, a personal radio, a citizen radio, or the like), a data communication terminal (a portable phone, a PHS (a feature phone and a smart phone), a pager, or the like), a broadcasting receiver (a television receiver and a radio), a portable radio, a portable television receiver, a one-seg receiver, another type of device (a wristwatch and a pocket watch), a hearing aid, a handheld GPS, a security buzzer, a flashlight/pen light, a battery pack, and the like. Examples of the above hearing aid include an ear-hook hearing aid, an ear hole fitting hearing aid, and a glasses-type hearing aid. The driving device 5 may be a desktop device such as a personal computer.

(Application Example of Magnetic Field Formation Device: Driving Device: Power-Receiving Coil Mechanism)

The driving device 5 includes the power-receiving coil mechanism 2 which is configured to receive power by a magnetic field. In addition to the power-receiving coil mechanism 2, the driving device 5 includes: a power control circuit 91 to which power is supplied from the power-receiving coil mechanism 2; and a magnetic member 4. The power-receiving coil mechanism 2, the power control circuit 91, and the magnetic member 4 are integrated as a power-receiving module 9. The power-receiving module 9 is connected to a secondary battery 10.

The power-receiving coil mechanism 2 is configured to receive power in such a way that magnetic field resonance is caused by a variable magnetic field in the housing region B (predetermined region A). To be more specific, the power-receiving coil mechanism 2 includes a power-receiving coil 21 and a power-receiving resonator 22 provided on the inner circumferential side of the power-receiving coil 21. The "magnetic field resonance" indicates a resonance phenomenon of synchronization at a resonance frequency of a variable magnetic field. Examples of the types of coils used in the power-receiving coil 21 and the power-receiving resonator 22 include: a spiral type, a solenoid type, and a loop type. In regard to the positional relation between the power-receiving coil 21 and the power-receiving resonator 22, the power-receiving coil 21 may be provided on the inner circumferential side or the outer circumference side of the power-receiving resonator 22, or the power-receiving coil 21 and the power-receiving resonator 22 may be provided not to overlap each other in the radial direction.

The driving device 5 includes the magnetic member 4 provided at the power-receiving coil mechanism 2. The magnetic member 4 increases the magnetic field strength by increasing the mutual inductance of the power-receiving coil mechanism 2 and increasing the magnetic flux density. As the magnetic field strength of the power-receiving coil mechanism 2 is increased by the magnetic member 4, the charging characteristic is maintained to be high in the power-receiving coil mechanism 2, and power at least at a desired level is receivable with an improved degree of freedom in the layout of the power-receiving coil mechanism 2. The power-receiving coil mechanism 2 preferably includes the magnetic member 4 but may not include the magnetic member 4.

The magnetic member 4 is provided on the inner circumferential side of the power-receiving coil mechanism 2. While the positional relation between the power-receiving coil mechanism 2 and the magnetic member 4 in the axial direction, i.e., the positional relation when viewed in the direction orthogonal to the axial direction is not particularly limited, these members are preferably provided so that the power-receiving coil mechanism 2 is provided at an intermediate portion between one end side and the other end side of the magnetic member 4. This "intermediate portion" between one end side and the other end side of the magnetic member 4 indicates a part of a region sandwiched between the one end and the other end, excluding the one end and the other end.

The positional relation between the power-receiving coil mechanism 2 and the magnetic member 4 in the axial direction is further preferably arranged so that the power-receiving coil mechanism 2 is provided at a central portion between one end side and the other end side of the magnetic member 4. The positional relation between the power-receiving coil mechanism 2 and the magnetic member 4 in the axial direction is preferably arranged such that the charging characteristic of the magnetic member 4 is not significantly different between a case where the coil surface 2a of the power-receiving coil mechanism 2 on one side faces a magnetic field generating surface 3a of the power-supplying coil mechanism 3 and a case where the coil surface 2b of the power-receiving coil mechanism 2 on the other side faces the magnetic field generating surface 3a.

The power-receiving resonator 22 of the power-receiving coil mechanism 2 is provided so that the power-receiving coil 21 is disposed on the outer circumference side. To be more specific, the power-receiving coil mechanism 2 is arranged such that the power-receiving resonator 22 is provided between the power-receiving coil 21 on the outermost circumferential side and the magnetic member 4 on the innermost circumferential side. While the positional relation between the power-receiving resonator 22 and the power-receiving coil 21 in the axial direction is not particularly limited, these members are preferably provided so that the power-receiving coil 21 is provided at an intermediate portion between one end side and the other end side of the power-receiving resonator 22. The positional relation between the power-receiving resonator 22 and the power-receiving coil 21 in the axial direction is further preferably arranged so that the power-receiving coil 21 is provided at a central portion between one end side and the other end side of the power-receiving resonator 22.

The magnetic member 4 is made of resin in which magnetic powder is dispersed. The resin used for the magnetic member 4 may be thermosetting resin or thermoplastic resin, and is not particularly limited. Examples of the thermosetting resin include epoxy resin, phenol resin, melamine resin, vinyl ester resin, cyano ester resin, maleimide resin, and silicon resin. Examples of the thermoplastic resin include acrylic resin, vinyl acetate based resin, and polyvinyl alcohol based resin. The present example adopts a resin whose main component is epoxy resin.

Further, soft magnetic powder is used as the magnetic powder dispersed in the resin. Examples of the soft magnetic powder include pure Fe, Fe—Si, Fe—Al—Si (sendust), Fe—Ni (permalloy) soft ferrites, Fe-base amorphous, Co-base amorphous, and Fe—Co (permendur); however, is not particularly limited. The shape of the magnetic member 4 is suitably determined, too.

(Application Example of Power Receiving/Supplying Device: Driving Device: Power Control Circuit)

Figure 13:
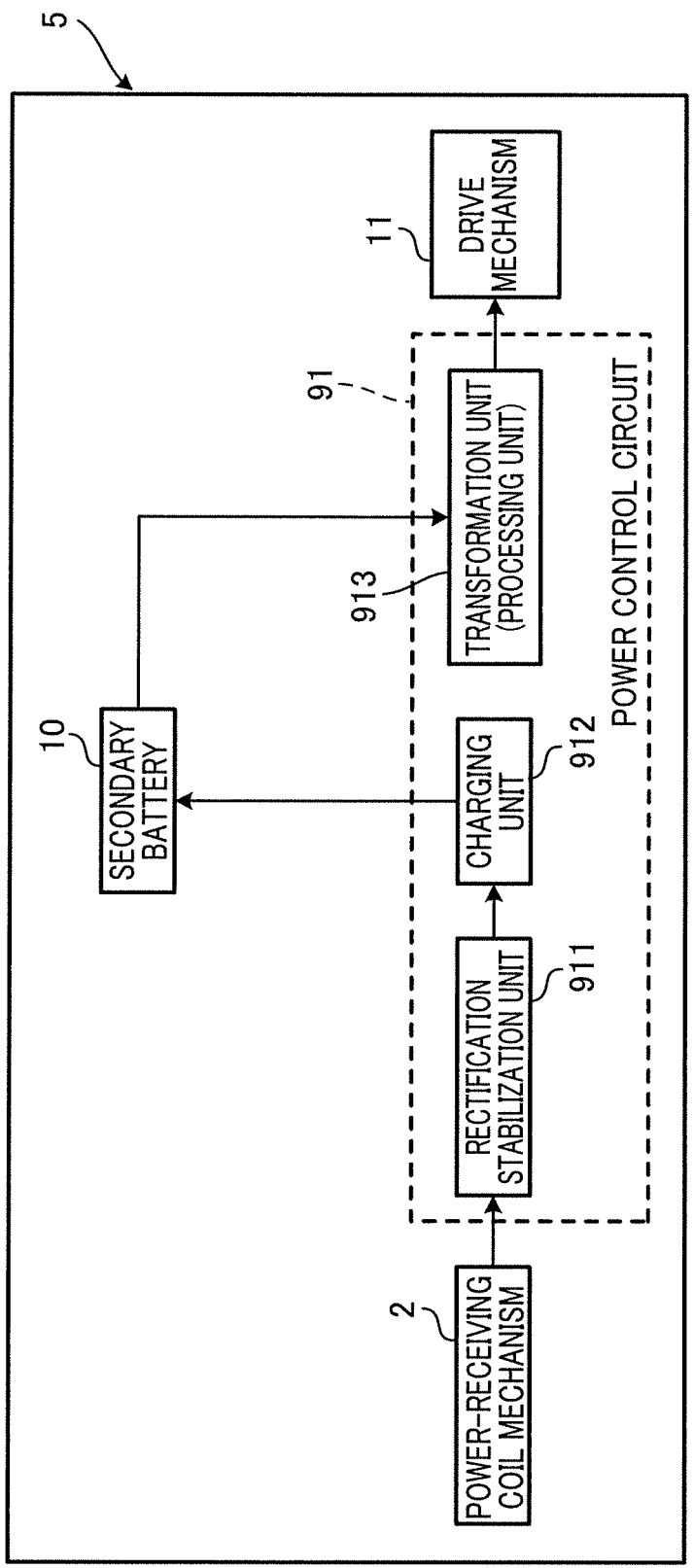
FIG. 13 is a block diagram of a driving device.

The power control circuit 91 is mounted on a circuit substrate:

As shown in FIG. 13, the power control circuit 91 has a function of controlling the charging of the secondary battery 10. The power control circuit 91 may be a circuit further having a function of controlling the discharging.

To be more specific, the power control circuit 91 includes a rectification stabilization unit 911 which is configured to output DC power by rectifying AC power supplied from the outside via the power-receiving coil mechanism 2 outputting the DC power, a charging unit 912 configured to supply the DC power outputted from the rectification stabilization unit 911 to the secondary battery 10 at a charging voltage, and a transformation unit 913 configured to execute a signal process. The transformation unit 913 is connected to a driving mechanism 11 which is driven by the charged power of the secondary battery 10.

The rectification stabilization unit 911 is a rectification-stabilization IC, for example. The rectification-stabilization IC is an IC in which functions such as full bridge synchronous rectification, voltage conditioning and wireless power control, and protection from a voltage, current, or temperature anomaly are integrated into one chip. The rectification stabilization unit 911 may not be provided when the power outputted from the power-receiving coil mechanism 2 is DC power.

The charging unit 912 is an IC (charging circuit) for a constant current/constant voltage linear charger, and has functions such as a function of notifying that the charging current has been reduced to a predetermined setting value, a function of ending the charging using a timer, a function of stabilizing the charging current by means of thermal feedback, and a function of limiting the chip temperature in a high-power mode or in high ambient temperatures.

The transformation unit 913 is a transformer circuit which functions as a transformation unit performing signal processing of converting the charged power of the secondary battery 10 to the driving power for the driving mechanism 11 and outputting the converted power. As the transformation unit 913, a linear regulator may be employed for voltage dropping, or a switching regulator or a charge pump may be employed for voltage boosting and voltage dropping. An example of each regulator is one adopting a semiconductor elements so the current is switched on and off at a high speed.

(Application Example of Power Receiving/Supplying Device: Driving Mechanism: Driving Device)

Examples of the driving mechanism 11 include a mechanism in which a component converting electric power to kinetic energy such as a speaker and a motor is incorporated, a light emitting mechanism or an illumination mechanism in which a component converting electric power to optical energy such as an LED light source and a laser light source is incorporated, and a microcomputer. Apart from these mechanisms, any types of mechanism driven by electric power may be used as the driving mechanism 11. The power-receiving coil mechanism 2 is configured to correspond to wireless power supply with which power supply is carried out in a mechanically contactless state. Examples of the wireless power supply include electromagnetic induction and magnetic field resonance (magnetic resonance).

(Application Example of Power Receiving/Supplying Device: Driving Device: Secondary Battery)

As the secondary battery 10, any type of batteries which are chargeable and rechargeable can be used. Examples of the secondary battery 10 include a lead storage battery, a valve-regulated lead storage battery, a lithium ion battery, a lithium ion polymer battery, a lithium iron phosphate ion battery, a lithium-sulfur battery, a lithium titanate battery, a nickel-cadmium storage battery, a nickel-hydrogen rechargeable battery, a nickel-iron battery, a nickel-lithium battery, a nickel-zinc battery, a rechargeable alkali battery, a sodium-sulfur battery, a redox flow battery, a zinc-bromine flow battery, a silicon battery, and a Silver-Zinc battery. The battery is able to drive a device longer than the nickel-hydrogen secondary battery.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the present invention, not to limit it. In addition, it will be understood by those skilled in the art that the other structures, systems, methods and the like included in the spirit of the present invention can be easily derived from the spirit of the invention described in the specification. Accordingly, it should be considered that the present invention covers equivalent structures thereof without departing from the spirit and scope of the invention as defined in the following claims. In addition, it is required to sufficiently refer to the documents that have been already disclosed, so as to fully understand the objects and effects of the present invention.

REFERENCE SIGNS LIST

1 power receiving/supplying device
2 power-receiving coil mechanism
3 power-supplying coil mechanism
4 magnetic member
5 driving device
6 housing cup
7 charger
8 power-supplying module
9 power-receiving module
10 secondary battery
16 connection switcher
17 current path switching control unit
21 power-receiving coil
22 power-receiving resonator
31 power feeding coil
111 power-supplying coil
112 power-supplying coil
131 oscillation controller
1312 oscillator
1221 coil piece
1222 coil piece
A predetermined region
B housing region

The invention claimed is:

1. A magnetic field formation device comprising:
a power supplying resonator including a plurality of coil pieces that are configured to generate a variable magnetic field, wherein the plurality of coil pieces each have coil ends that are respectively connected to each other; and
a power-supplying coil configured to generate an induced current for at least one of the plurality of coil pieces;
a plurality of connection switchers that are respectively provided for each coil piece in the plurality of coil pieces, each connection switcher being configured to switch the respective coil ends between: (a) a forward connection state, and (b) a reverse connection state; and
a switching controller that controls the plurality of connection switchers to respectively alternately switch the coil ends of each respective coil piece between the forward connection state and the reverse connection state such that a coil winding direction is alternately and repeatedly changed.

2. A power-supplying device comprising:
the magnetic field formation device according to claim 1.

3. A power-receiving device comprising:
a power-receiving mechanism configured to receive power by a variable magnetic field generated at a predetermined region by the magnetic field formation device according to claim 1.

4. A power receiving/supplying device comprising:
a power-supplying device including the magnetic field formation device according to claim 1, the power-supplying device being configured to generate power by a variable magnetic field via the magnetic field formation device; and
a power-receiving device including a power-receiving mechanism that is configured to receive the generated power from the power-supplying device.

5. A mobile device comprising:
a power-receiving mechanism that is configured to receive power by a variable magnetic field generated at a predetermined region by the magnetic field formation device according to claim 1.

6. The magnetic field formation device according to claim 1, wherein the connection switches for each coil piece are connected in series.

7. A magnetic field formation device comprising:
a power supplying resonator including a plurality of coil pieces that are configured to generate a variable magnetic field, wherein the plurality of coil pieces each have coil ends that are respectively connected to each other; and
a power-supplying coil configured to generate an induced current for at least one of the plurality of coil pieces;
a plurality of connection switchers that are respectively provided for each coil piece in the plurality of coil pieces, each connection switcher being configured to switch the respective coil ends between: (a) a forward connection state, and (b) a reverse connection state; and
a switching circuit and/or microcomputer configured to:
control the plurality of connection switchers to respectively alternately switch the coil ends of each respective coil piece between the forward connection state and the reverse connection state such that a coil winding direction is alternately and repeatedly changed.

* * * * *